(12) United States Patent
Taylor III et al.

(10) Patent No.: US 6,851,398 B2
(45) Date of Patent: Feb. 8, 2005

(54) METHOD AND APPARATUS FOR CONTROLLING A FUEL REFORMER BY USE OF EXISTING VEHICLE CONTROL SIGNALS

(75) Inventors: William Taylor III, Columbus, IN (US); Dennis A. Kramer, Troy, MI (US); Shawn D. Bauer, Indianapolis, IN (US)

(73) Assignee: Arvin Technologies, Inc., Troy, MI (US)

( * ) Notice: Subject to any disclaimer, the term of this patent is extended or adjusted under 35 U.S.C. 154(b) by 11 days.

(21) Appl. No.: 10/366,163

(22) Filed: Feb. 13, 2003

(65) Prior Publication Data

US 2004/0159289 A1 Aug. 19, 2004

(51) Int. Cl.[7] .................................................. F02B 43/08
(52) U.S. Cl. ........................................... 123/3; 123/1 A
(58) Field of Search ...................... 123/3, 1 A; 180/65.2

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,131 A | 7/1977 | Elmore |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,339,546 A | 7/1982 | Randalls |
| 4,436,793 A | 3/1984 | Adlhart |
| 4,458,634 A | 7/1984 | Carr et al. |
| 4,469,932 A | 9/1984 | Spiegelberg et al. |
| 4,473,622 A | 9/1984 | Chuldzinski et al. |

(List continued on next page.)

FOREIGN PATENT DOCUMENTS

| | | |
|---|---|---|
| DD | 237120 A1 | 7/1986 |
| DE | 30 48 540 | 7/1982 |
| DE | 195 10 804 | 9/1996 |
| DE | 19644864 A1 | 5/1998 |
| DE | 197 57 936 | 7/1999 |

(List continued on next page.)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).

(List continued on next page.)

Primary Examiner—Henry C. Yuen
Assistant Examiner—Jason Benton
(74) Attorney, Agent, or Firm—Barnes & Thornburg

(57) ABSTRACT

A reformer controller is electrically coupled to both a fuel reformer and an engine control unit. The reformer controller is configured to communicate with the engine control unit to monitor an engine load signal between the engine control unit and an internal combustion engine. The reformer controller operates the fuel reformer in response to the engine load signal. A method of operating a fuel reformer is also disclosed.

17 Claims, 3 Drawing Sheets

U.S. PATENT DOCUMENTS

| | | | |
|---|---|---|---|
| 4,522,894 A | 6/1985 | Hwang et al. | |
| 4,578,955 A | 4/1986 | Medina | |
| 4,625,511 A | 12/1986 | Scheitlin et al. | |
| 4,625,681 A | 12/1986 | Sutekiyo | |
| 4,645,521 A | 2/1987 | Freesh | |
| 4,651,524 A | 3/1987 | Brighton | |
| 4,657,829 A | 4/1987 | McElroy et al. | |
| 4,830,492 A | 5/1989 | Ko | |
| 4,841,925 A | 6/1989 | Ward | |
| 4,928,227 A | 5/1990 | Burba et al. | |
| 4,963,792 A | 10/1990 | Parker | |
| 4,967,118 A | 10/1990 | Urataki et al. | |
| 5,095,247 A | 3/1992 | Hanamura | |
| 5,138,959 A | 8/1992 | Kulkarni | |
| 5,143,025 A | 9/1992 | Munday | |
| 5,159,900 A | 11/1992 | Damman | |
| 5,205,912 A | 4/1993 | Murphy | |
| 5,207,185 A | 5/1993 | Greiner et al. | |
| 5,212,431 A | 5/1993 | Origuchi et al. | |
| 5,228,529 A | 7/1993 | Rosner | |
| 5,272,871 A | 12/1993 | Oshima et al. | |
| 5,284,503 A | 2/1994 | Bitler et al. | |
| 5,293,743 A | 3/1994 | Usleman et al. | |
| 5,317,996 A | 6/1994 | Lansing | |
| 5,362,939 A | 11/1994 | Hanus et al. | |
| 5,409,784 A | 4/1995 | Bromberg et al. | |
| 5,409,785 A | 4/1995 | Nakano et al. | |
| 5,412,946 A | 5/1995 | Oshima et al. | |
| 5,425,332 A | 6/1995 | Rabinovich et al. | |
| 5,437,250 A | 8/1995 | Rabinovich et al. | |
| 5,441,401 A | 8/1995 | Yamaguro et al. | |
| 5,445,841 A | 8/1995 | Arendt et al. | |
| 5,451,740 A | 9/1995 | Hanus et al. | |
| 5,515,814 A * | 5/1996 | Cooke | 123/3 |
| 5,560,890 A | 10/1996 | Berman et al. | |
| 5,599,758 A | 2/1997 | Guth et al. | |
| 5,660,602 A | 8/1997 | Collier, Jr. et al. | |
| 5,666,923 A | 9/1997 | Collier, Jr. et al. | |
| 5,785,136 A * | 7/1998 | Falkenmayer et al. | 180/65.2 |
| 5,787,864 A | 8/1998 | Collier, Jr. et al. | |
| 5,813,222 A | 9/1998 | Appleby | |
| 5,826,548 A | 10/1998 | Richardson, Jr. | |
| 5,845,485 A | 12/1998 | Murphy et al. | |
| 5,847,353 A | 12/1998 | Titus et al. | |
| 5,852,927 A | 12/1998 | Cohn et al. | |
| 5,887,554 A * | 3/1999 | Cohn et al. | 123/3 |
| 5,894,725 A | 4/1999 | Cullen et al. | |
| 5,910,097 A | 6/1999 | Boegner et al. | |
| 5,921,076 A | 7/1999 | Krutzsch et al. | |
| 5,974,791 A | 11/1999 | Hirota et al. | |
| 6,012,326 A | 1/2000 | Raybone et al. | |
| 6,014,593 A | 1/2000 | Grufman | |
| 6,047,543 A | 4/2000 | Caren et al. | |
| 6,048,500 A | 4/2000 | Caren et al. | |
| 6,082,102 A | 7/2000 | Wissler et al. | |
| 6,122,909 A | 9/2000 | Murphy et al. | |
| 6,125,629 A | 10/2000 | Patchett | |
| 6,130,260 A | 10/2000 | Hall et al. | |
| 6,134,882 A | 10/2000 | Huynh et al. | |
| 6,152,118 A | 11/2000 | Sasaki et al. | |
| 6,176,078 B1 | 1/2001 | Balko et al. | |
| 6,235,254 B1 | 5/2001 | Murphy et al. | |
| 6,248,684 B1 | 6/2001 | Yavuz et al. | |
| 6,284,157 B1 | 9/2001 | Eliasson et al. | |
| 6,311,232 B1 | 10/2001 | Cagle et al. | |
| 6,318,306 B1 * | 11/2001 | Komatsu | 123/3 |
| 6,322,757 B1 | 11/2001 | Cohn et al. | |
| 6,502,533 B1 * | 1/2003 | Meacham | 123/3 |
| 6,651,597 B2 * | 11/2003 | Daniel et al. | 123/3 |
| 6,655,130 B1 * | 12/2003 | Kirwan et al. | 60/284 |
| 6,702,991 B1 * | 3/2004 | Smaling et al. | 422/186.21 |
| 2002/0012618 A1 | 1/2002 | Bromberg et al. | |
| 2002/0194835 A1 | 12/2002 | Bromberg et al. | |

FOREIGN PATENT DOCUMENTS

| | | |
|---|---|---|
| DE | 19927518 | 1/2001 |
| EP | 0096538 | 12/1983 |
| EP | 0153116 | 8/1985 |
| EP | 0485922 A1 | 5/1992 |
| EP | 1030395 | 8/2000 |
| EP | 1057998 | 12/2000 |
| FR | 2593493 | 7/1987 |
| FR | 2620436 | 3/1989 |
| GB | 355210 | 2/1930 |
| GB | 1221317 | 2/1971 |
| GB | 2241746 | 9/1991 |
| JP | 51 27630 | 8/1976 |
| JP | 02 121300 | 5/1990 |
| JP | 03195305 | 8/1991 |
| JP | 05 231242 | 9/1993 |
| JP | 07 292372 | 11/1995 |
| SU | 1519762 | 11/1989 |
| WO | WO 85/00159 | 1/1985 |
| WO | WO 94/03263 | 2/1994 |
| WO | WO 95/06194 | 3/1995 |
| WO | WO 96/24441 | 8/1996 |
| WO | WO 98/45582 | 10/1998 |
| WO | WO 00/26518 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Breshears et al., "Partial Hydrogen Injection Into Internal Combustion Engines", Proceedings of the EPA $1^{st}$ Symposium on Low Pollution Power Systems and Development, Ann Arbor, MI, pp. 268–277 (Oct. 1973).

Chuveliov et al., "Comparison of Alternative Energy Technologies Utilizing Fossil Fuels and Hydrogen Based on Their Damage to Population and Environment in the USSR and East Europe", pp. 269–300.

Correa, "Lean Premixed Combustion for Gas–Turbines: Review and Required Research", PD–vol. 33, Fossile Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydrogen–Operated Engine System: Nature of Pollutants and their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Safety, Environmental Implants and Costs", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", pp. 1359–1369, Advances in Hydrogen Energy 3 (Jun. 13–17, 1982).

Hall et al., "Initial Studies of a New Type of Ignitor: The Railplug"—SAE Paper 912319, pp. 1730–1746 (1991).

Houseman et al., "Hydrogen Engines Based On Liquid Fuels, A Review", G.E., Proc., $3^{rd}$ World Hydrogen Energy Conf., pp. 949–968 (1980).

Houseman, et al., "Two Stage Combustion for Low Emissions Without Catalytic Converters", Proc. of Automobile Engineering Meeting, Dearborn, MI, pp. 1–9 (Oct. 18–22, 1976).

Jones, et al., "Exhaust Gas Reforming of Hydrocarbon Fuels", Soc. of Automotive Engineers, Paper 931086, pp. 223–234 (1993).

Kaske et al., "Hydrogen Production by the Hüls Plasma–Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development of a 24 kW Gas Turbine–Driven Generator Set for Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Further Analysis of Railplugs as a New Type of Ignitor", SAE Paper 922167, pp. 1851–1862 (1992).

Mishchenko et al., "Hydrogen as a Fuel for Road Vehicles", Proc. VII World Hydrogen Energy Conference, vol. 3, pp. 2037–2056 (1988).

Monroe et al., "Evaluation of a Cu/Zeolite Catalyst to Remove $NO_x$ from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Rabinovich et al., "Plasmatron Internal Combustion Engine System for Vehicle Pollution Reduction", Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, Warrendale, PA, U.S.A., pp. 81–84 (Aug. 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progress V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Tachtler, "Fuel Cell Auxiliary Power Unit—Innovation for the Electric Supply of Passenger Cars?", Society of Automotive Engineers, Paper No. 2000–01–0374, pp. 109–117 (2000).

Kirwan, "Fast Start–Up On–Board Gasoline Reformer for Near Zero Emissions in Spark–Ignition Engines", Society of Automotive Engineers World Congress, Detroit, MI (Mar. 4–7, 2002), Paper No. 2002–01–1011.

Bromberg, "Emissions Reductions Using Hydrogen from Plasmatron Fuel Converters", Int. J. of Hydrogen Energy 26, pp. 1115–1121 (2001).

Bromberg, "Experimental Evaluation of SI Engine Operation Supplemented by Hydrogen Rich Gas from a Compact Plasma Boosted Reformer", Massachusetts Institute of Technology Plasma Science and Fusion Center Report, JA–99–32 (1999).

Bromberg, "Compact Plasmatron–Boosted Hydrogen Generation Technology for Vehicular Applications", Int. J. of Hydrogen Energy 24, pp 341–350 (1999).

Gore, "Hydrogen A Go–Go", Discover, p. 92–93, (Jul., 1999).

Burch, "An Investigation of the $NO/H_2/O_2$ Reaction on Noble–Metal Catalysts at Low Temperatures Under Lean–Burn Conditions," Journal of Applied Catalysis B: Environmental 23, pp. 115–121 (1999).

Costa, "An Investigation of the $NO/H_2/O_2$ (Lean De–$No_x$) Reaction on a Highly Active and Selective $Pt/La_{0.7}Sr_{0.2}Ce_{0.1}FeO_3$ Catalyst at Low Temperatures", Journal of Catalysis 209, pp. 456–471 (2002).

Kirwan, "Development of a Fast Start–up O Gasoline Reformer for Near Zero Spark–Ignition Engines", Delphi Automotive Systems, pp. 1–21 (2002).

Shelef, "Twenty–five Years after Introduction of Automotive Catalysts: What Next?" Journal of Catalysis Today 62, pp. 35–50 (2000).

Koebel, "Selective Catalytic Reduction on NO and $NO_2$ at Low Temperatures", Journal of Catalysis Today 73, pp. 239–247 (2002).

Frank, "Kinetics and Mechanism of the Reduction of Nitric Oxides by $H_2$ Under Lean–Burn Conditions on a Pt–Mo–Co/ α–$Al_2O_3$ Catalyst", Journal of Applied Catalysis B: Environmental 19, pp. 45–57 (1998).

Nanba, "Product Analysis of Selective Catalytic Reduction of $NO_2$ with $C_2H_4$ Over H–Ferrierite", Journal of Catalysis 211, pp. 53–63 (2002).

Simanaitis, "Whither the Automobile?", Road and Track, pp. 98–102 (Sep. 2001).

Stokes, "A Gasoline Engine Concept for Improved Fuel Economy—The Lean Boost System", International Falls Fuels and Lubricants Meeting and Exposition, Baltimore, MD, SAE Technical Paper Series, 14 pages (Oct. 16–19, 2000).

Chandler, "Device May Spark Clean–Running Cars", The Boston Globe, p. E1 (Jul. 12, 1999).

* cited by examiner

METHOD AND APPARATUS FOR CONTROLLING A FUEL REFORMER BY USE OF EXISTING VEHICLE CONTROL SIGNALS

FIELD OF THE DISCLOSURE

The present disclosure relates to a control system for a fuel reformer, and more particularly to a fuel reformer control system operated by use of existing vehicle controls.

BACKGROUND OF THE DISCLOSURE

Fuel reformers reform hydrocarbon fuel into a reformate gas such as hydrogen-rich gas. In the case of an onboard fuel reformer or a fuel reformer associated with a stationary power generator, the reformate gas produced by the fuel reformer may be utilized as fuel or fuel additive in the operation of an internal combustion engine. The reformate gas may also be utilized to regenerate or otherwise condition an emission abatement device associated with an internal combustion engine or as a fuel for a fuel cell.

SUMMARY OF THE DISCLOSURE

According to one aspect of the present disclosure, there is provided a system having a reformer controller for controlling operation of a fuel reformer. The reformer controller monitors signals between an engine control unit and an internal combustion engine and executes a routine for controlling operation of the fuel reformer based on such signals. The fuel reformer may supply reformate gas to the internal combustion engine or an emissions abatement device, for example. Further, the reformer controller and engine control unit may be separate components, or the reformer controller may be integrated into the engine control unit such that a single hardware assembly is used to control both the fuel reformer and the engine, for example.

According to an illustrative embodiment, a method of operating a fuel reformer is provided. The method includes monitoring a signal between an internal combustion engine and an engine control unit and operating the fuel reformer in response to the signal between the engine and the engine control unit. The operating step includes adjusting an air-to-fuel ratio of an air/fuel mixture processed by the fuel reformer in response to the signal between the engine and the engine control unit.

In one embodiment, the monitoring step includes monitoring an ignition timing signal output from the engine control unit to the engine. The operating step further includes generating a reformer control signal based on the ignition timing signal and sending the reformer control signal to the fuel reformer. The generating step may include phase-shifting the ignition timing signal to create the reformer control signal.

In another embodiment, the monitoring step includes monitoring a throttle position signal sent from the engine to the engine control unit. Similarly, the operating step further includes generating a reformer control signal based on the throttle position signal and sending the reformer control signal to the fuel reformer. The generating step may include phase shifting the throttle position signal to create the reformer control signal to be received by the fuel reformer.

According to another illustrative embodiment, there is provided a system for operating a fuel reformer by use of existing vehicle controls. The system includes a fuel reformer having an air/fuel input assembly and a reformer controller electrically coupled to an engine and to the air/fuel input assembly of the fuel reformer. The reformer controller includes a processing unit and a memory unit electrically coupled to the processing unit. The memory unit has stored therein a plurality of instructions which, when executed by the processing unit, causes the processing unit to (i) monitor a signal between the engine and an engine control unit and (ii) operate the fuel reformer in response to the signal between the engine and the engine control unit.

The signal may be an ignition timing signal sent from the engine control module to the engine or a throttle position signal sent from the engine to the engine control module, for example. The memory unit may also cause the processing unit to phase shift the signal to create a reformer control signal to be sent to the fuel reformer for operation thereof.

According to still another illustrative embodiment, there is provided a method of operating a fuel reformer. The method includes monitoring a load of an engine and generating a load signal based on thereon, and operating the fuel reformer based on the load signal.

The above and other features of the present disclosure will become apparent from the following description and the attached drawings.

DETAILED DESCRIPTION OF THE DRAWINGS

Figure 1:
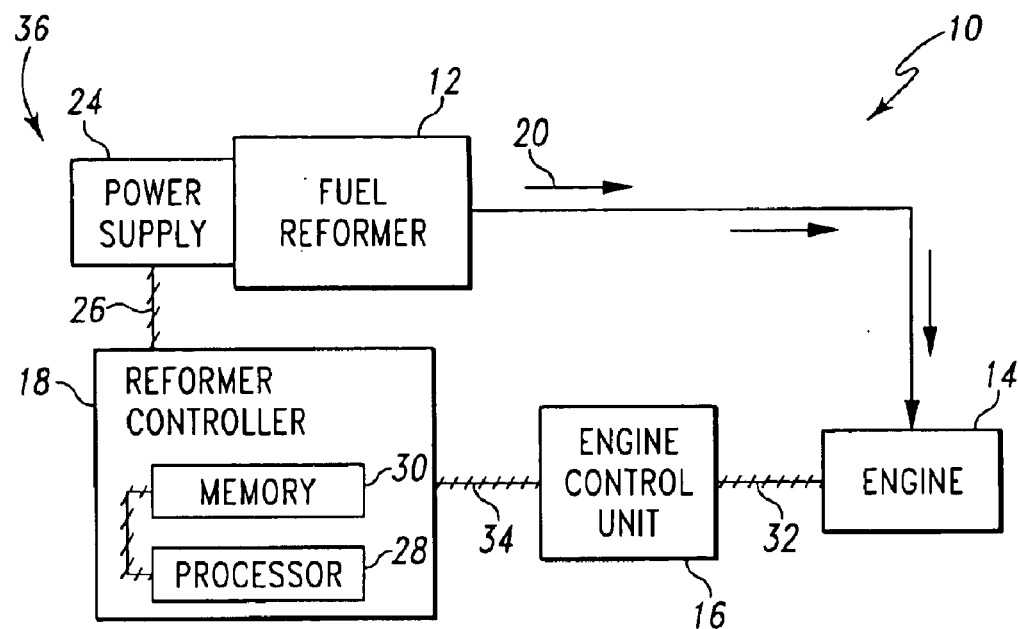
FIG. 1 is a simplified block diagram of a power system having a fuel reformer, a reformer controller to operate the fuel reformer, and an engine control unit to operate an internal combustion engine of the system, and further showing the reformate gas produced by the fuel reformer supplied to the engine.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an illustrative power system 10 including a fuel reformer 12, an internal combustion engine 14, and an engine control unit 16. As will be described herein in greater detail, fuel reformer 12 using information obtained from engine control unit 16. Internal combustion engine 14 may be embodied as any type of internal combustion engine including, for example, a spark-ignited gasoline engine, a diesel engine, a natural gas engine, or the like. The internal combustion engine 14 produces mechanical output which is utilized to drive or otherwise mechanically power a driven mechanism (not shown) such as a transmission, specifically a vehicle transmission, which is utilized to propel a vehicle or a power generator or the like for producing electrical power.

System 10 further includes a reformer controller 18 for controlling the operation of fuel reformer 12. Illustratively, fuel reformer 12 supplies reformate gas 20 to the intake manifold of the engine 14 for use as a fuel or fuel additive, for example. However, it is within the scope of this disclosure for fuel reformer 12 to supply reformate gas 20 to various other components such as an emissions abatement device 22 (shown in FIG. 3), a fuel cell (not shown), etc.

Figure 2:
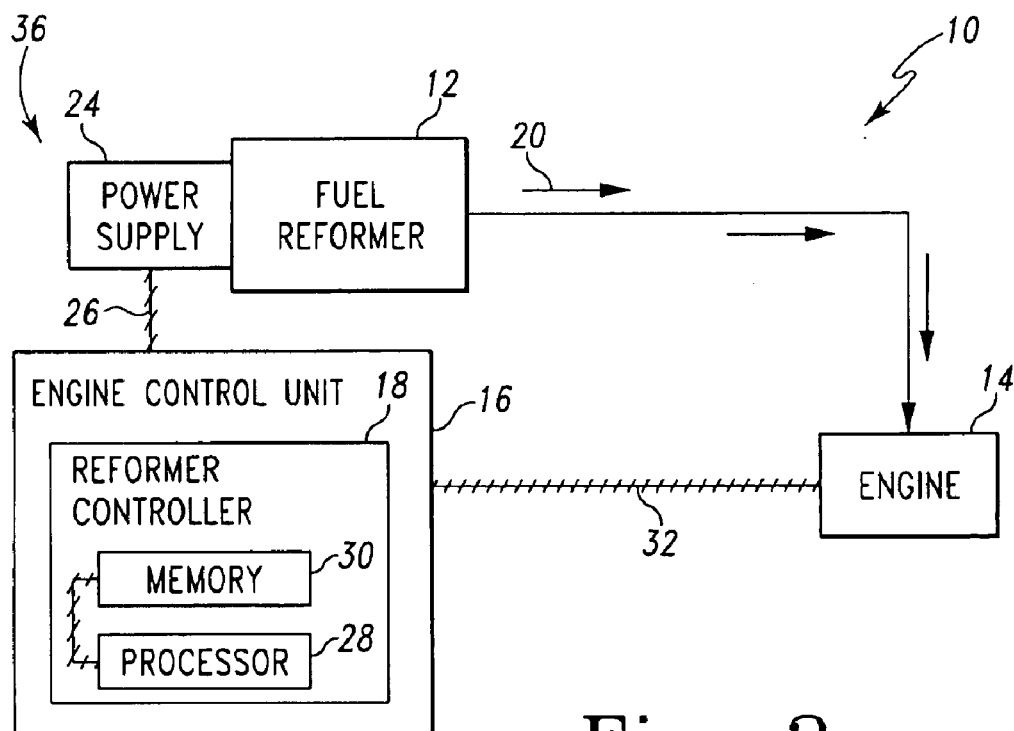
FIG. 2 is a simplified block diagram similar to FIG. 1 except that the reformer controller is integrated into the engine control unit.
Figure 3:
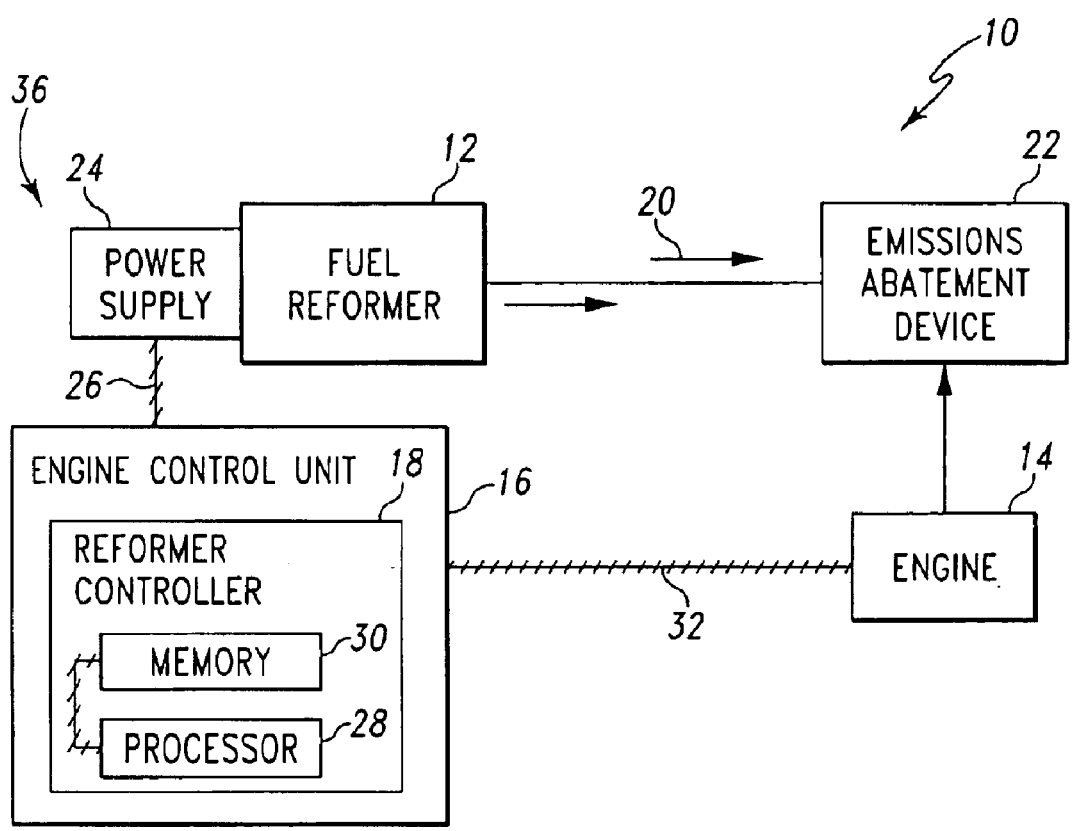
FIG. 3 is a simplified block diagram similar to FIG. 2 showing a power system in which the reformate gas produced by the fuel reformer is supplied to an emissions abatement device.

As shown in FIG. 1, the reformer controller 18 and the engine control unit 16 are discrete components separate from each other. It should be appreciated, however, that the reformer controller 18 may be integrated into an engine control unit 16, as shown in FIG. 2. In such a way, a single hardware assembly may be utilized to control both the fuel reformer 12 and the engine 14. Further, as shown in FIGS. 1–3, there are shown specific exemplary implementations of the power system 10. In the embodiments shown in FIGS. 1 and 2, the output from the fuel reformer 12 (i.e., reformate gas 20) is supplied to the intake of the engine 14, whereas in the embodiment shown in FIG. 3, the output from fuel reformer 12 is supplied to an emissions abatement device 22 such as a NOx absorber or a soot filter, for example.

As mentioned above, operation of fuel reformer 12 is based on a number of existing vehicle operating parameters. Conventionally, these existing vehicle operating parameters are monitored by engine control unit 16 through the use of known sensors (not shown), for example, coupled to engine 14. Therefore, it may not be necessary to provide direct communication between reformer controller 18 and engine 14 using various additional sensors to obtain this same data to be used to operate fuel reformer 12. The present disclosure, therefore, provides that reformer controller 18 uses existing information about the operational diagnostics of engine 14 which is readily obtained from engine control unit 16. As shown in FIG. 1, controller 18 of system 10 obtains or collects its data directly from the engine control unit 16 via a signal line 34 between reformer controller 18 and engine control unit 16, as is discussed in more detail below. Therefore, the existing vehicle systems are also effectively monitored by the reformer controller 18 which allows reformer controller 18 to assess the information as it is gathered and provide a calculated response to such parameters to vary or adjust the operation of fuel reformer 12 as necessary. This use of existing vehicle control signals to control fuel reformer 12 reduces the number of discrete sensors that must be added to a preexisting system when modifying that system to include a fuel reformer, such as fuel reformer 12, for example.

In addition to obtaining information from engine control unit 16, controller 18 may also obtain control information associated with other vehicle parameters from any other system on the vehicle, including passive and mechanical controls, for example. The controller 18 generates a calculated response to such input in order to adjust the operation of the fuel reformer 12 to meet the changing needs of system 10. As mentioned above, reformer controller 18 may be either a separate component of system 10 in communication with engine control unit 16 along signal line 34, as shown in FIG. 1, or reformer controller 18 may be incorporated into an existing engine control unit 16 as shown in FIG. 2, for example. A similar illustrative power system disclosing an integrated electronic control unit for controlling both a fuel reformer and an internal combustion engine of the power system is shown and described in commonly-assigned U.S. patent application Ser. No. 10/245,268. This application is hereby incorporated by reference herein.

Specifically, controller 18 of power system 10 monitors existing output signals of engine 14 to unit 16 as well as existing input signals from unit 16 to engine 14. For example, controller 18 monitors any information or data which may be used to determine engine load, such as ignition timing and throttle position, for example. This information is then used in a calculated response to control the operation of fuel reformer 12.

Referring back to FIG. 1, a passageway (not shown) connects fuel reformer 12 with the intake of engine 14. Fuel reformer 12 reforms (i.e., converts) hydrocarbon fuel into reformate gas 20 that includes, among other things, hydrogen and carbon monoxide. Reformate gas 20 is conducted through the passageway to engine 14 so that reformate gas 20 may be used to operate engine 14 more efficiently and reduce various engine emissions, for example.

Fuel reformer 12 may be embodied as any type of fuel reformer, such as, for example, a catalytic fuel reformer, a thermal fuel reformer, a steam fuel reformer, or any other type of partial oxidation fuel reformer. Fuel reformer 12 may also be embodied as a plasma fuel reformer. A plasma fuel reformer uses plasma to convert a mixture of air and hydrocarbon fuel into a reformate gas rich in hydrogen and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of which are hereby incorporated by reference.

As shown in FIG. 1, fuel reformer 12 and its associated components are under the control of reformer controller 18. In particular, components such as temperature, pressure, or gas composition sensors (not shown), a fuel inlet assembly such as a fuel injector (not shown), and air inlet valve(s) (not shown) are each electrically coupled to the reformer controller 18. Moreover, a power supply 24 is electrically coupled to the reformer controller 18 via a signal line 26. Although signal line 26 is shown schematically as a single line, it should be appreciated that signal line 26, along with the signal line(s) associated with each of the other components of system 10, for example, may be configured as any type of signal carrying assembly which allows for the transmission of electrical signals in either one or both directions between the reformer controller 18 and the corresponding component.

For example, any one or more of the signal lines may be embodied as a wiring harness having a number of signal lines which transmit electrical signals between the reformer controller 18 and the corresponding component. It should be appreciated that any number of other wiring configurations may also be used. For example, individual signal wires may be used, or a system utilizing a signal multiplexer may be used for the design of any one or more of the signal lines. Moreover, the signal lines may be integrated such that a single harness or system is utilized to electrically couple some or all of the components associated with fuel reformer 12 to reformer controller 18.

The reformer controller 18 is, in essence, the master computer responsible for interpreting electrical signals sent by sensors associated with the fuel reformer 12 and for activating electronically-controlled components associated with the fuel reformer 12 in order to control the fuel reformer 12. For example, the reformer controller 18 of the present disclosure is operable to, amongst many other things, actuate or shutdown the fuel reformer 12, determine the beginning and end of each injection cycle of fuel into the fuel reformer 12, calculate and control the amount and ratio of air and fuel to be introduced into the fuel reformer 12, determine the temperature of the fuel reformer 12, and determine the power level to supply to the fuel reformer 12.

To do so, the reformer controller 18 includes a number of electronic components commonly associated with electronic units which are utilized in the control of electromechanical systems. For example, the reformer controller 18 may include, amongst other components customarily included in such devices, a processor such as a microprocessor 28 and a memory device 30 such as a programmable read-only memory device ("PROM") including erasable PROM's (EPROM's or EEPROM's). The memory device 30 is provided to store, amongst other things, instructions in the form of, for example, a software routine (or routines) which, when executed by the microprocessor 28, allows the reformer controller 18 to control operation of the fuel reformer 12.

The reformer controller 18 also includes an analog interface circuit (not shown). The analog interface circuit converts the output signals from the various fuel reformer sensors into a signal which is suitable for presentation to an input of the microprocessor 28. In particular, the analog interface circuit, by use of an analog-to-digital (A/D) converter (not shown) or the like, converts the analog signals generated by the sensors into a digital signal for use by the microprocessor 28. It should be appreciated that the A/D converter may be embodied as a discrete device or number of devices, or may be integrated into the microprocessor. It should also be appreciated that if any one or more of the sensors associated with the fuel reformer 12 generate a digital output signal, the analog interface circuit may be bypassed.

Similarly, the analog interface circuit converts signals from the microprocessor 28 into an output signal which is suitable for presentation to the electrically-controlled components associated with the fuel reformer 12 (e.g., the power supply 24). In particular, the analog interface circuit, by use of a digital-to-analog (D/A) converter (not shown) or the like, converts the digital signals generated by the microprocessor 28 into analog signals for use by the electronically-controlled components associated with the fuel reformer 12 such as the power supply 24. It should be appreciated that, similar to the A/D converter described above, the D/A converter may be embodied as a discrete device or number of devices, or may be integrated into the microprocessor 28. It should also be appreciated that if any one or more of the electronically-controlled components associated with the fuel reformer 12 operate on a digital input signal, the analog interface circuit may be bypassed.

Hence, the reformer controller 18 may be operated to control operation of the fuel reformer 12. In particular, the reformer controller 18 executes a routine including, amongst other things, a closed-loop control scheme in which the reformer controller 18 monitors outputs of the sensors (not shown) associated with the fuel reformer 12 as well as various signals sent between engine 14 and engine control unit 16 in order to control the inputs to the electronically-controlled components associated therewith. To do so, the reformer controller 18 communicates with the sensors associated with the fuel reformer 12 in order to determine, amongst numerous other things, the amount, temperature, and/or pressure of air and/or fuel being supplied to the fuel reformer 12, the amount of oxygen in the reformate gas, the temperature of the reformate gas being produced thereby, and the composition of the reformate gas. Armed with this data as well as data obtained from engine control unit 16 regarding the operating parameters of engine 14, the reformer controller 18 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through the air inlet valve(s), etcetera.

As mentioned above, reformer controller 18 is electrically coupled to power supply 24 along signal line 26. As such, the reformer controller 18 communicates with the power supply 24 to selectively operate and shutdown the fuel reformer 12. Collectively, the fuel reformer 12 and the reformer controller 18 define a fuel reformer system 36 which, among other uses, may be used in the construction of an onboard system for a vehicle or a stationary power generator.

The engine 14, on the other hand, is under the control of engine control unit 16. In particular, engine systems, such as vehicle systems for use in the design of a stationary power generator, include an engine control unit which is, in essence, the master computer responsible for interpreting electrical signals sent by engine sensors and for activating electronically-controlled engine components to control the engine. For example, an engine control unit is operable to, amongst many other things, determine the ignition timing, the throttle position, the beginning and end of each injection cycle of each cylinder, or determine both fuel metering and injection timing in response to sensed parameters such as engine crankshaft position and rpm, engine coolant and intake air temperature, and absolute intake air boost pressure.

In particular, the engine control unit 16 is electrically coupled to a number of electronically-controlled components associated with the engine 14 (e.g., a fuel injector assembly, ignition assembly, etcetera) via a signal line 32. As with the signal lines associated with the fuel reformer 12, the signal line 32 may be any type of signal carrying connector including a wiring harness for carrying the electrical signals associated with numerous engine components.

In particular, as mentioned above, illustrative power system 10 uses information based on the load of the engine 14 to operate fuel reformer 12. The amount of reformate gas 20 required to efficiently operate engine 14 is based, at least in part, on the load which is placed on engine 14 due to other operational factors. Therefore, information known to engine control unit 16 relating to the load of engine 14 is sent to reformer controller 18.

Figure 4:
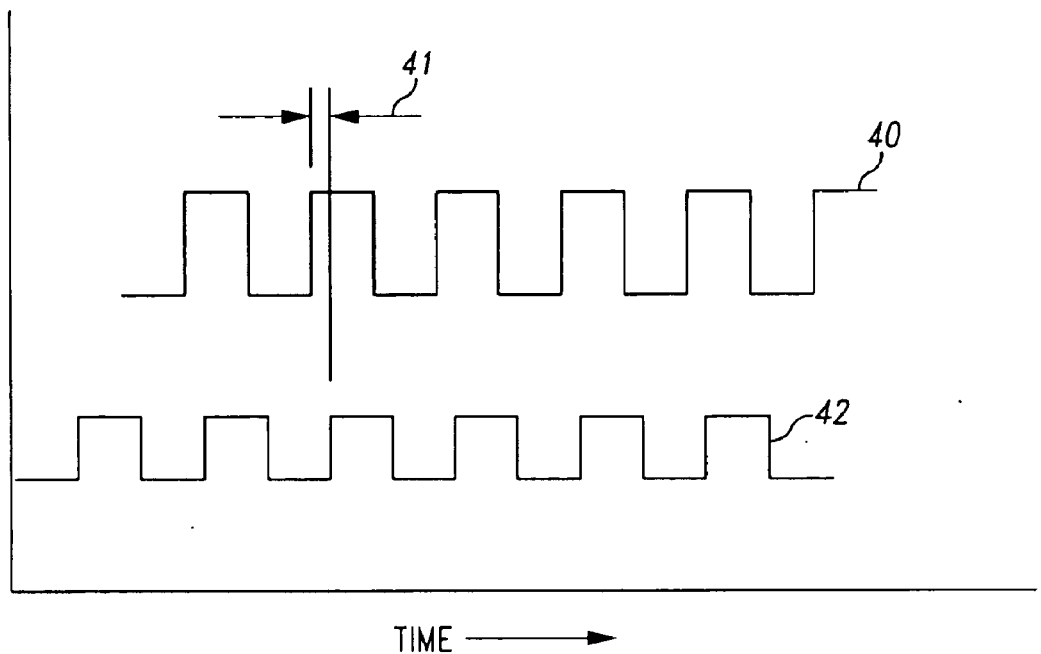
FIG. 4 is a graph showing an illustrative ignition timing signal sent from the engine control unit to the engine, and also showing an illustrative reformer control signal below the ignition timing signal which was generated by the reformer controller from the ignition timing signal.

For example, an ignition timing signal is an output of engine control unit 16 that is sent to engine 14 along signal line 32 to allow engine control unit 16 to properly control and operate engine 14. This pulsed signal varies in response to the load placed on engine 14. Therefore, this signal may be used by reformer controller 18 to operate fuel reformer 12. For example, an illustrative pulsed ignition timing signal 40 is shown in FIG. 4 along with an illustrative phase-shifted reformer control signal 42 used to operate fuel reformer 12. Microprocessor 28 of controller 18 monitors ignition timing signal 40 and generates reformer control signal 42 based on ignition timing signal 40. It is within the scope of this disclosure to phase-shift or manipulate ignition timing signal 40 as necessary to create a reformer control signal for appropriately controlling fuel reformer 12 based on the needs of system 10. As shown in FIG. 4, such phase shifting of reformer control signal 42 is represented by reference numeral 41. Such manipulation of the ignition timing signal 40 may be accomplished by performing a phase-shifting calculation using, for example, a monostable multi-vibrator, a pulse stretcher, a pulse coder, etc. to phase shift the fuel reformer 12 operation based on such ignition timing signal 40. Reformer control signal 42 may also be configured to have a different frequency or amplitude than that of the ignition timing signal 40.

Figure 5:
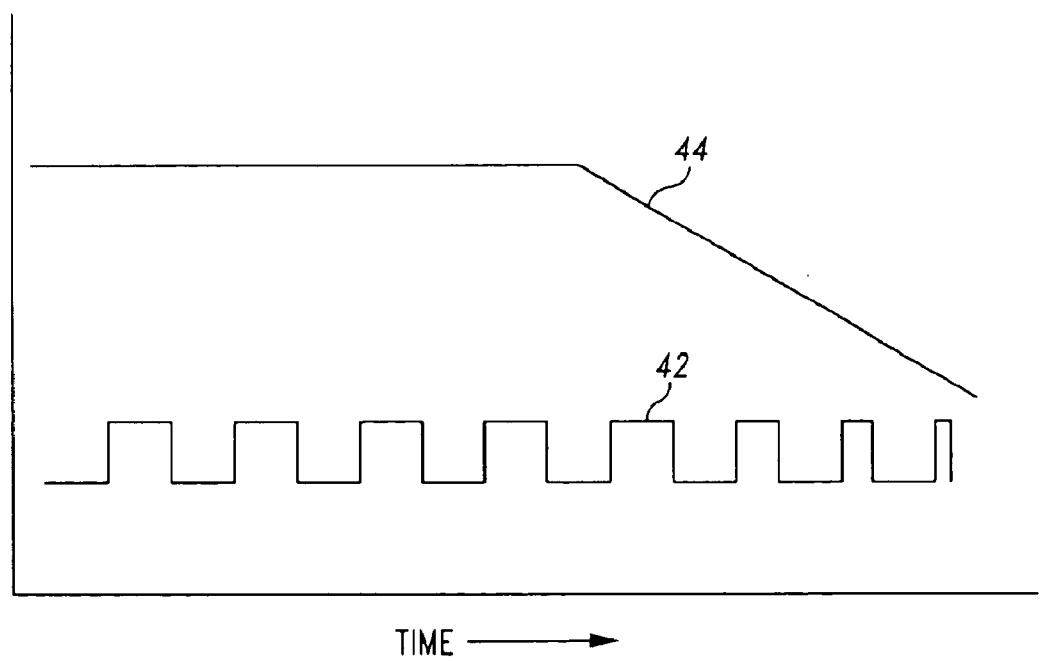
FIG. 5 is a graph showing an illustrative throttle position signal which is output from the engine to the engine control unit, and also showing another pulsed reformer control signal generated from the throttle position signal.

Further, a throttle position signal 44 is also indicative of engine load and may be used to generate an appropriate reformer control signal in response thereto. Throttle position signal 44 is a signal normally input into engine control unit 16 from engine 14. Illustrative throttle position signal 44 is shown in FIG. 5 as a linear analog signal. Illustrative reformer signal 42, generated by reformer controller 18 in response to throttle position signal 44, is a pulsed signal and is shown below the linear throttle position signal 44. In other words, throttle position signal 44, sent along signal line 32 from engine 14 to engine control unit 16, is read by reformer controller 18, and manipulated by reformer controller 18 to generate reformer control signal 42. Reformer control signal 42 is then sent along signal line 26 to power supply 24, associated with fuel reformer 12, to effectively control the operation of fuel reformer 12. Illustrative throttle position signal 44 may remain steady or may change, as shown in FIG. 5, according to torque or other operating characteristics of the engine. The control pulses of the reformer control signal 42 may be altered (e.g. the length or duty cycle thereof) in response to such changes in the throttle position over time.

Therefore, as described above, fuel reformer 12 is operated through the use of existing vehicle control signals, such as ignition timing signal 40 and throttle position signal 44, for example. Reformer controller 18 may monitor other signals received by engine control unit 16 and/or sent from engine control unit 16 to control the operation of fuel reformer 12 as well. For example, other signals bearing engine load information are monitored and manipulated to generate reformer signal 42.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

What is claimed is:

1. A method of operating a fuel reformer, the method comprising the steps of:

operating a fuel injector assembly in response to an injector signal from an engine control unit so as to inject fuel from the fuel injector assembly into an internal combustion engine but not into the fuel reformer, monitoring a signal between the internal combustion engine and the engine control unit, and operating the fuel reformer in response to the signal between the engine and the engine control unit, wherein the monitoring step further comprises monitoring an ignition timing signal output from the engine control module to the engine, the fuel reformer operating step includes generating a reformer control signal based on the ignition timing signal and sending the reformer control signal to the fuel reformer, and the generating step includes phase-shifting the ignition timing signal to create the reformer control signal.

2. A method of operating a fuel reformer, the method comprising the steps of:

operating a fuel injector assembly in response to an injector signal from an engine control unit so as to inject fuel from the fuel injector assembly into an internal combustion engine but not into the fuel reformer, monitoring a signal between the internal combustion engine and the engine control unit, and operating the fuel reformer in response to the signal between the engine and the engine control unit, wherein the step of operating the fuel reformer comprises operating a plasma fuel reformer in response to the signal between the engine and the engine control unit.

3. The method of claim 2, wherein the operating step comprises adjusting an air-to-fuel ratio of an air/fuel mixture processed by the fuel reformer in response to the signal between the engine and the engine control module.

4. The method of claim 2, wherein the monitoring step further comprises monitoring an ignition timing signal output from the engine control module to the engine.

5. The method of claim 4, wherein the operating step includes generating a reformer control signal based on the ignition timing signal and sending the reformer control signal to the fuel reformer.

6. The method of claim 2, wherein the monitoring step further comprises monitoring a throttle position signal input into the engine control unit from the engine.

7. The method of claim 6, wherein the operating step includes generating a reformer control signal based on the throttle position signal and sending the reformer control signal to the fuel reformer.

8. A method of operating a fuel reformer, the method comprising the steps of:

operating a fuel injector assembly so as to inject fuel from the fuel injector assembly into an internal combustion engine but not into the fuel reformer, monitoring an engine load signal based on load of the internal combustion engine, generating a reformer control signal based on the engine load signal, and operating the fuel reformer based on the reformer control signal, wherein the step of operating the fuel reformer comprises sending the reformer control signal to a power supply associated with a plasma fuel reformer and operating the plasma fuel reformer based on the reformer control signal sent to the power supply.

9. The method of claim 8, wherein the engine load signal is an ignition timing signal sent from an engine control unit of the system to the engine.

10. The method of claim 8, wherein the engine load signal is a throttle position signal sent from the engine to an engine control unit of the system.

11. The method of claim 8, wherein the step of generating a reformer control signal includes phase-shifting the engine load signal.

12. A power system comprising:
   a fuel reformer,
   a fuel injector assembly for injecting fuel into an engine but not into the fuel reformer,
   an engine control unit coupled to the engine and configured to generate an injector signal to control operation of the fuel injector assembly, and
   a controller electrically coupled to both the fuel reformer and the engine control unit wherein the controller comprises (i) a processor, and (ii) a memory device electrically coupled to the processor, the memory device having stored therein a plurality of instructions which, when executed by the processor, causes the processor to:
   (a) monitor a signal between the engine control unit and the engine;
   (b) generate a reformer control signal based on the signal between the engine control unit and the engine; and
   (c) operate the fuel reformer based on the reformer control signal,
   wherein the fuel reformer is a plasma fuel reformer.

13. The power system of claim 12, wherein the signal between the engine control unit and the engine is an ignition timing signal sent from the engine control unit to the engine.

14. The power system of claim 13, wherein the plurality of instructions, when executed by the processor, cause the processor to generate the reformer control signal based on the ignition timing signal.

15. The power system of claim 12, wherein the signal between the engine control unit and the engine is a throttle position signal sent from the engine to the engine control unit.

16. The power system of claim 15, wherein the plurality of instructions, when executed by the processor, cause the processor to generate the reformer control signal based on the throttle position signal.

17. A power system comprising:
   a fuel reformer,
   a fuel injector assembly for injecting fuel into an engine but not into the fuel reformer,
   an engine control unit coupled to the engine and configured to generate an injector signal to control operation of the fuel injector assembly,
   a controller electrically coupled to both the fuel reformer and the engine control unit wherein the controller comprises (i) a processor, and (ii) a memory device electrically coupled to the processor, the memory device having stored therein a plurality of instructions which, when executed by the processor, causes the processor to:
   (a) monitor a signal between the engine control unit and the engine;
   (b) generate a reformer control signal based on the signal between the engine control unit and the engine; and
   (c) operate the fuel reformer based on the reformer control signal, and
   an emissions abatement device fluidly coupled to the fuel reformer to receive reformate gas produced by operation of the fuel reformer based on the reformer control signal.

* * * * *